Aug. 25, 1959     J. E. STARR     2,900,818
COLUMN ELONGATION TRANSDUCER TYPE TESTING MACHINE
Filed Oct. 22, 1957

INVENTOR
James E. Starr.
BY Wm. R. Glisson
ATTORNEY

United States Patent Office 2,900,818
Patented Aug. 25, 1959

2,900,818

COLUMN ELONGATION TRANSDUCER TYPE TESTING MACHINE

James E. Starr, Rosemont, Pa., assignor to Tatnall Measuring Systems Company, Philadelphia, Pa., a corporation of Delaware Application October 22, 1957, Serial No. 691,754

4 Claims. (Cl. 73—95)

This invention relates to a column elongation type testing machine and has for an object the provision of improvements in this art.

Testing machines have heretofore been provided in which one or more of the supporting and load carrying columns has been used as a form of extensometer for determining the strain or change in length of the specimen being tested. By arranging a suitable transducer between a fixed point and a movable point on the column the change in length of the column was made evident in an electrical system.

This machine was convenient to use if all specimens were of the same length; but if the specimens were of different lengths so as to require a shift of the position of one of the specimen holding members, such as a crosshead, along the columns, then the length of the column which served as an extensometer would vary correspondingly and it was necessary to take this change in effective length into account in computing the strain or change in length of the specimen.

According to the present invention this difficulty is avoided by using a supplemental outer column to carry the crosshead and to connect the outer column to one end of the main load-carrying column whereby the point of application of the load to the main interior column always remains the same no matter where the crosshead is secured along the length of the outer column.

The invention will best be understood from the following description of an exemplary embodiment, reference being made to the accompanying drawings wherein.

Figure 2:
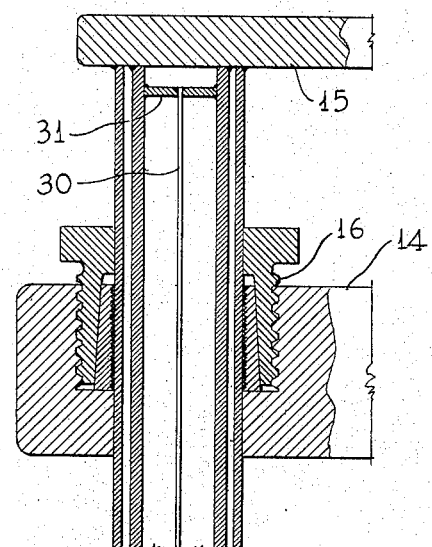
Fig. 2 is an enlarged vertical section through one of the columns, taken approximately on the line 2—2 of Fig. 1; and, Fig. 3 is an enlarged horizontal section taken on the line 3—3 of Fig. 2.
Figure 1:
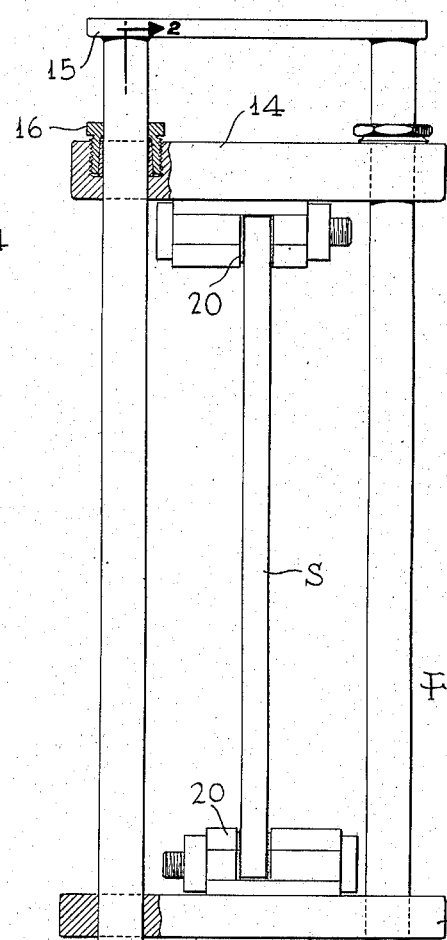
Fig. 1 is a side elevation of a testing machine embodying the invention.

As shown in the drawings, the testing machine comprises a base 10, a plurality of columnar supports, generally indicated by the numeral 11, a movable table 12, a power ram 13 therefor, a shiftable crosshead 14, and a column tie beam 15. The crosshead is secured to the columns in different adjusted positions by gripping devices 16. The gripping devices are shown by way of example as a screw nut and wedge ring arrangement but it will be understood that gripping devices of different types and with more rapid gripping and release action can be substituted if desired.

The table and crosshead are provided with grippers 20 for holding the ends of a specimen S for either tension or compression testing. Within the specimen grippers there are provided rapidly acting elements of known or improved types, not shown here.

Figure 3:
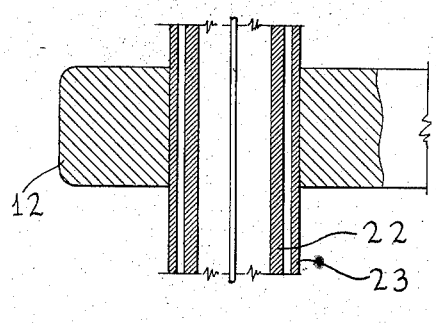
Figure 3:
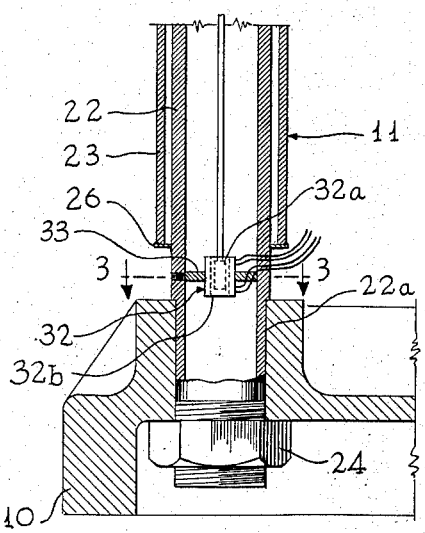
Figure 3:
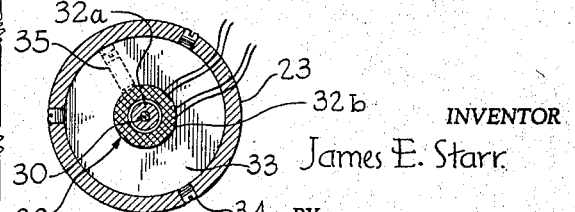

One of the columns 11 with which the present invention is especially concerned is shown in Fig. 2 and 3. It comprises an inner structural column 22 and an outer column 23. The inner column 22 is secured to the base 10, as by a reduced portion 22a, fitting within a bore in the base and provided with a nut 24. At its upper end the inner column 22 is secured to the top tie beam 15 as by fillet welding or other suitable means. The outer column 23 is secured to the top tie beam in a similar manner. At its lower end it is guided along the inner column by a spacer such as an annular ring 26 welded to the outer column. If a very thin flexible diaphragm spacer ring is used it may be welded to both columns to provide a complete seal and avoid sliding movement, the relative movements due to loadings being fairly small.

It will be seen that the load is transmitted from the crosshead 14 to the outer column 23 and through it to the upper end of the inner column 22. The table 12 slides along the outer columns. It will be seen that by this arrangement the full length of the inner column 22 is always subjected to the load no matter where the crosshead is located along the outer column 23. There is thus provided an extensometer member, so to speak, which is always a simple unit in the calculations which renders the provision of comparative measurements very easy.

To provide a measurement and reading of the change in length or strain in the column 22 between fixed points there is provided a comparator rod 30 which is not subjected to loading. At its upper end it is secured to the column 22 by a plate 31 and at its lower end is associated with a transducer 32 of any suitable type. An inductance transducer is shown and comprises a core 32a and an outer coil 32b. The coil is secured within the column at a predetermined point by a plate 33, screws 34 being used to secure the plate in the column and one or more screws 35 being used to secure the coil to the plate 33.

It is thus seen that the invention provides a simple and convenient arrangement for measuring loads on a machine having means for accommodating specimens of greatly varying lengths. The crosshead adjustments along the column are made in the same manner as with other machines in which the effective length of the columns subjected to loads varied with each crosshead setting and with which complex measurements and computations were involved. The effective load measuring elements are enclosed where they will not be damaged and the loaded column which acts as the extensometer element is never subjected to crosshead securement which might mar it. Protected as it is by the outer column to which the crosshead is secured, the inner column is not subjected to rusting or corrosition which would alter its effective size.

While one embodiment of the invention has been described for purposes of illustration, it is to be understood that there may be various modifications and embodiments within the general scope of the invention.

What is claimed is:

1. In a testing machine in combination, a plurality of columns, spaced load-applying members carried thereby including a crosshead selectively securable at different points along the length of the columns, means for applying a load on a specimen secured between said spaced members to load the columns, at least one of the columns including an outer column member and an inner column member secured to the outer column member at one end and connected with a load-applying element at its other end, the outer column member carrying the crosshead at various points along its length and the inner column member always having the load applied to its full length, and means for measuring the change in length of said inner column member.

2. Apparatus as set forth in claim 1, further characterized by the fact that said measuring means comprises an inner rod attached to said inner column member at one point along its load-bearing length and is operatively interrelated with a movement measuring device at another point along the load-bearing length of the inner column member spaced at a distance from the point of attachment of the rod.

3. Apparatus as set forth in claim 2, further characterized by the fact that said movement measuring device comprises an electrical transducer.

4. Apparatus as set forth in claim 2, further characterized by the fact that said movement measuring device comprises an electrical induction transducer having relatively movable parts carried by said rod and inner column member respectively.

References Cited in the file of this patent

UNITED STATES PATENTS

| | | |
|---|---|---|
| 1,952,523 | Abbott | Mar. 27, 1934 |
| 2,533,279 | Moore et al. | Dec. 12, 1950 |
| 2,685,200 | Slottow et al. | Aug. 3, 1954 |

FOREIGN PATENTS

| | | |
|---|---|---|
| 632,601 | Great Britain | Nov. 28, 1949 |
| 763,374 | Great Britain | Dec. 12, 1956 |